STARTING CIRCUIT FOR SEMICONDUCTOR INVERTERS

Filed Nov. 8, 1961

INVENTOR.
JAMES LEE JENSEN
BY Omund R. Dahle
ATTORNEY 3,172,060

STARTING CIRCUIT FOR SEMICONDUCTOR INVERTERS

James Lee Jensen, St. Louis Park, Minn., assignor to Honeywell Inc., a corporation of Delaware Filed Nov. 8, 1961, Ser. No. 151,033
6 Claims. (Cl. 331—113)

This invention relates to transistor D.C. to A.C. inverter circuits and is more particularly related to a transistor inverter oscillator circuit having passive circuit means to assist starting of the oscillator under load.

In the type of transistor inverter for converting D.C. power to A.C. power such as is generally shown in the Jensen Patent 2,774,878, if one depends solely on the inherent asymmetry of the transistors used in this type inverter to start the oscillations, starting difficulties may occur when the output of the inverter system is heavily loaded. The starting circuit of the present invention is intended to overcome this difficulty by providing a double polarity starting pulse. A forward bias pulse is first applied to one of the transistors and this pulse is subsequently followed by applying a reverse bias to the same transistor.

An object of this invention is to provide a transistor oscillator having a passive circuit to facilitate starting of the oscillator.

Another object of the invention is to provide a push-pull transistor oscillator having a starting circuit effective to provide in sequence a forward bias followed by a reverse bias to one transistor to facilitate starting of the oscillations.

These and other objects of the invention will become more apparent upon consideration of the accompanying specification, claims and drawing of which:

Figure 1:
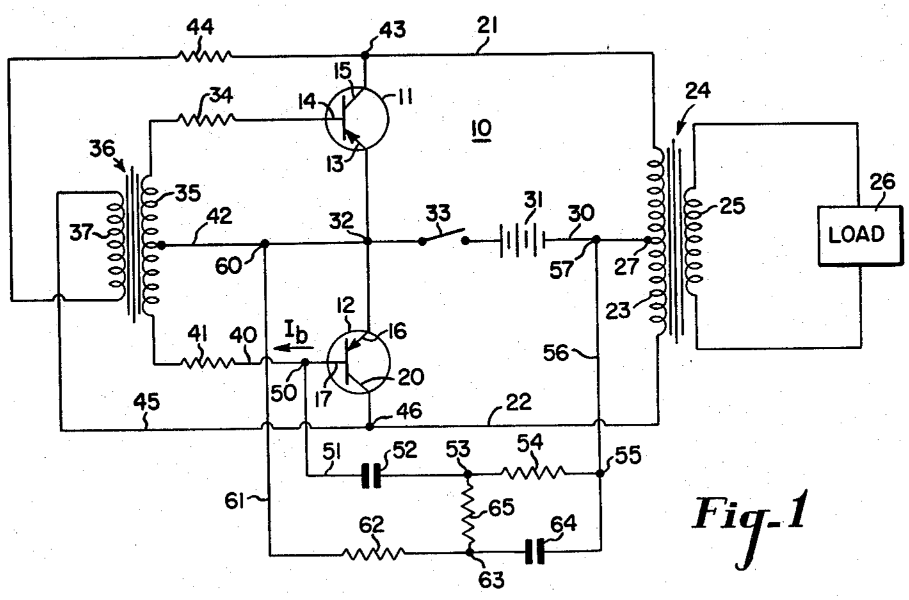
FIGURE 1 is a schematic diagram of an embodiment of the invention.

Referring now to FIGURE 1, there is disclosed a transistor inverter or oscillator 10 for converting a direct current potential to an alternating current type potential. The inverter 10 includes a pair of transistors 11 and 12, which are disclosed as PNP junction type transistors although the type of transistor utilized in this invention is not intended to be so limited. Transistor 11 has an emitter electrode 13, a base electrode 14, and a collector electrode 15. Transistor 12 has an emitter electrode 16, a base electrode 17, and a collector electrode 20. The collector electrodes 15 and 20 are connected by a pair of conductors 21 and 22 to opposite terminals of a center-tapped primary winding 23 of a power output transformer 24. Output transformer 24, which may be a step up transformer, also includes a secondary winding 25 which is connected to supply power to suitable load means 26. The load means may include rectifying means to produce the high voltage D.C. if desired. The center-tap of primary winding 23 is connected by a conductor 20 to the negative terminal of a D.C. source 31, here shown as a battery. The emitter electrodes 13 and 16 are directly connected together at a junction 32, junction 32 being connected through a power switch 33 to the positive terminal of source 31.

The base electrode 14 is connected through a resistor 34 to the upper terminal of a center-tapped secondary winding 35 of a saturating transformer 36. The saturating transformer 36 also includes a primary winding 37. The base electrode 17 is connected by a conductor 40, and a resistor 41 to the lower terminal of the secondary winding 35. The center-tap of secondary winding 35 is connected by a conductor 42 to the emitter electrodes at junction 32.

A regenerative feedback path may be traced from a junction 43 on the conductor 21 through a current limiting resistor 44, the primary winding 37 of saturating transformer 36, and through a conductor 45 to a junction 46 on the conductor 22.

The passive double pulse starting circuit components for the oscillator will now be described. A first circuit may be traced from a junction 50 on the conductor 40 which is directly connected to base electrodes 17 and through a conductor 51, a capacitor 52, a junction 53, a resistor 54, a junction 55, and a conductor 56 to a junction 57 on the conductor 30. A second circuit may be traced from a junction 60 on the conductor 42 through a conductor 61, a resistor 62, a junction 63, a capacitor 64, to the junction 55 and through conductor 56 to the junction 57. A resistor 65 interconnects the junctions 53 and 63. The time constant of resistor 54 and capacitor 52 is short compared to the RC time constant of resistor 62 and capacitor 64.

The basic oscillator 10, as described in the above identified patent, is assumed to start automatically on the basis of a dissimilarity in the leakage currents of one transistor with respect to the other. The transistor with the greater leakage current caused a voltage drop across the output transformer primary winding and across the regenerative feedback winding in a direction to cause the leaking transistor to increase in conduction thus commencing the oscillation. It has been observed that under certain adverse conditions of operation, such as if the inverter is feeding a relatively heavy load, the inverter may fail to start when the switch 33 is closed. This invention is directed towards a novel passage double pulse starting circuit for assuring that oscillations will commence when the switch 33 is closed.

In considering the operation of the circuit of FIGURE 1, let it first be assumed that the inverter is energized and operating in a normal manner. During the half cycle that transistor 11 is conductive, a current path may be traced from the positive terminal of battery 31 through the switch 33, from emitter to collector of transistor 11, through conductor 21 and the upper portion of primary winding 23 to center-tap 27 and then through conductor 30 to the negative terminal of battery 31. During this half cycle of operation conductor 21 is positive with respect to conductor 22 and a regenerative feedback current flows from junction 43 through the current limiting resistor 44 and primary winding 37 of the saturating feedback transformer 36 and through conductor 45 to junction 46. The resultant voltage induced on winding 35 is negative at the top thereby and maintaining transistor 11 conductive.

Operation continues with transistor 11 conducting and transistor 12 cut off until the core of transformer 36 reaches a saturated condition. The bias to base 14 is thereby reduced, reducing the conduction of transistor 11 and therefore reducing the current through the upper portion of winding 23. The collapsing field on transformer 24 causes the polarities to reverse, the feedback induced on winding 35 being also reversed in polarity such that the lower end of winding 35 becomes negative rendering transistor 12 conductive. This state of operation continues with transistor 12 conducting and 11 cut off until the core of saturating transformer 36 saturates in the opposite direction completing the second half cycle whereupon the cycle repeats. An alternating current is thereby induced in the secondary winding 25 to be supplied to the load device 26.

The above discussion assumes the oscillator is already operating properly. Various conditions may cause the oscillator 10 to fail to start when the power supply switch 33 is closed, such as by having a substantially heavy load on the output of the apparatus. In this invention a double pulse starting circuit is coupled to one of the transistors of the push-pull pair to aid the initiation of oscillations under adverse conditions. As the power is applied to the inverter by closing switch 33 a current path is provided from the positive terminal of the source 31 through the switch 33, from emitter 16 to base 17 through the capacitor 52 and resistor 54 to the negative terminal of the battery rapidly charging capacitor 52 to a voltage approaching that of source 31. This RC circuit comprising capacitor 52 and resitsor 54 has a brief time constant when compared with the RC circuit of resistor 62 and capacitor 64.

Figure 2:
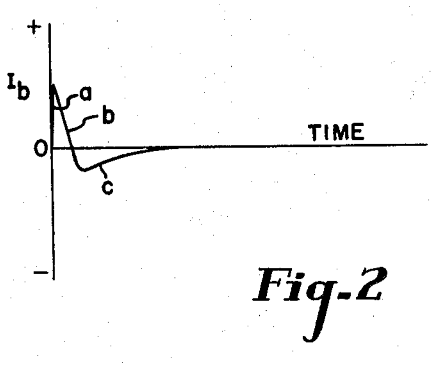
FIGURE 2 is a graphical showing of wave shapes occurring in the circuit of FIGURE 1.

Referring now to FIGURE 2, curve *a*, the sharply rising current pulse indicates the forward current into the base of transistor 12 tending to render it conductive and initiate oscillation as the capacitor 52 charges. This forward current pulse decreases, however, as the capacitor 52 becomes charged to a voltage approaching the potential of source 31 and as capacitor 64 subsequently charges primarily through resistor 62 the voltage divider comprising resistors 65 and 54 raises the potential of the junction 53. The voltage appearing across the resistor 54 plus the voltage across capacitor 52 exceeds the supply potential of source 31 to place a reverse bias, curve *c*, FIGURE 2, on the base of transistor 12, tending to turn it completely off. Thus, in sequence, a forward bias and then a reverse bias is placed on the transistor 12 to assist starting the inverter by overcoming conditions of an insufficient initial current in transistor 12 or an excess initial current in transistor 12.

It should be noted that if the initial forward current flowing through transistor 12 during the charging of capacitor 52 is in a direction to sufficiently unbalance the conductivities of the two transistors 11 and 12, the resulting regenerative feedback potential through feedback transformer 36 will be sufficient to initiate oscillation and to over-ride the subsequent reverse bias produced by the charging of capacitor 64. In this case conduction will continue in transistor 12 till core 36 saturates.

Let us now assume that the leakage current of transistor 11 exceeds that of transistor 12 so that the initial forward current pulse in transistor 12, as discussed above, is in a direction to tend to equalize rather than further unbalance conductivities of the two transistors. In this case the forward pulse will not aid in initiating oscillation, however, when the subsequent reverse bias to base 17 of transistor 12 produced by the charging of capacitor 64 appears, the reverse bias is effective to reduce the leakage current of transistor 12 down to $Ic_0$, the fundamental junction leakage current, which may be approximately two orders of magnitude less than the normal leakage of the transistor 12, and sufficient unbalance between the conductivities of the transistors will have been accomplished to initiate the oscillation.

In one successful embodiment of my invention the following components were utilized:

| | | |
|---|---|---|
| Resistor **54** | ohms | 100K |
| Resistor **62** | do | 100K |
| Resistor **65** | do | 100K |
| Capacitor **52** | μfd | .1 |
| Capacitor **64** | μfd | 1.1 |

Figure 3:
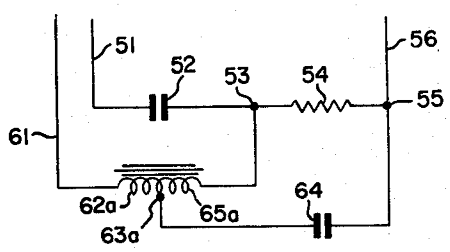
FIGURE 3 is a modification of the circuit of FIGURE 1.

FIGURE 3 shows a modification of the starting circuit of FIGURE 1 in which the resistors 62 and 65 are replaced by an autotransformer having a winding portion 62a connected to conductor 61, a tap connection 63a, and a further winding portion 65a which is connected to junction 53.

Many changes and modifications of this invention may become apparent to those who are skilled in the art and I therefore wish it to be understood that I intend to be limited by the scope of the appended claims and not by the specific embodiments of my invention which are disclosed herein for the purpose of illustration only.

I claim:

1. Starting circuitry for transistor power inverter means comprising in combination: transistor inverter means for converting a direct current potential to an alternating current potential, said means including a pair of transistors each having an input and a pair of output electrodes, output means, a source of direct current potential, means including said output means connecting said source of potential to said output electrodes, feedback means including saturable impedance means connected from the output means to the input electrodes of said transistors; a first capacitive charging circuit having a first time constant connected between the input electrode of one of said pair of transistors and said source of direct current potential; a second capacitive charging circuit having a second time constant substantially greater than said first time constant and being connected between said output means and in common with one of said pair of output electrodes on each of said transistors; and impedance means independent of said saturable impedance means connecting said first charging circuit to said second charging circut such that when said source is connected into said inverter circuit the current flowing through said first charging circuit biases said one of said pair of transistors in the forward direction for a first predetermined time interval directly proportional to said first time constant and the current flowing through said second charging circuit causes a reverse bias to be applied to said one of said transistors for a second predetermined time interval directly proportional to said second time constant after the cessation of said first interval.

2. Starting circuitry for transistor power inverter means comprising in combination: transistor power inverter means for converting a direct current potential to an alternating current potential, said inverter means including a pair of transistors each having an input electrode and a pair of output electrodes, output means, a source of direct current potential, means including said output means connecting said source of potential to said output electrodes on said pair of transistors, and feedback means including saturable impedance means connected from the output means to the input electrodes of said transistors; a first charging circuit including a first capacitor and a first resistor connected in series between said input electrode on one of said pair of transistors and said output means; a second charging circuit including a second capacitor and a second resistor connected in series between a common junction between the first of said pair of output electrodes on each of said pair of transistors and said output means; and a third resistor connected between the junction between said first resistor and capacitor and the junction between said second resistor and capacitor, said first charging circuit having a shorter time constant than said second charging circuit.

3. A starting circuit for a push-pull transistor inverter comprising in combination: transistor power inverter means for converting a direct current potential to an alternating current potential, said inverter means including a pair of transistors each having emitter, collector, and base electrodes, a source of direct current voltage having first and second terminals, means including output transformer means connecting said first source terminal to said collector electrodes on said pair of transistors, means connecting said second source terminal to the emitter electrodes on said pair of transistors, and means including saturable transformer means coupled to said base electrodes on said pair of transistors for applying regenerative feedback signals from said output transformer to said base electrodes for rendering said transistors alternately conductive; means connecting a first capacitor and a first resistor in series between the base electrode on one of said transistors and said first source terminal; means connecting a second resistor and a second capacitor in series between said emitter electrodes on said pair of transistors and said first source terminal; and a third resistor connected between the junction between said first resistor and capacitor and the junction between said second resistor and capacitor.

4. Starting circuitry for oscillators comprising: oscillator means having a feedback circuit for applying a regenerative feedback signal to the input of said oscillator means; means connecting said oscillator to a source of direct current energy for energizing said oscillator; a first charging circuit including a first capacitor and a first resistor connected in series between said feedback circuit and said source; a second charging circuit including a second capacitor and a second resistor connected in series between said feedback circuit and said source; and means connecting said first charging circuit to said second charging circuit such that when said source is connected to said oscillator the current flowing through said first circuit biases said feedback circuit in a first polarity for a first predetermined time interval and subsequently the current flowing through said second charging circuit causes an opposite polarity bias to be applied in said feedback circuit for a second predetermined time interval after said first interval, said first and second bias signals being effective to promote initiation of oscillation in said oscillator.

5. Starting circuitry for oscillators comprising: oscillator means having a feedback circuit for applying a regenerative feedback signal to the input of said oscillator means; means connecting said oscillator to a source of direct current energy for energizing said oscillator; a first charging circuit including a first capacitor and a first resistor connected in series between said feedback circuit and said source; a second charging circuit having a relatively long time constant with respect to said first charging circuit including a second capacitor and a second resistor connected in series between said feedback circuit and said source; and third resistor means connecting said first charging circuit to said second charging circuit such that when said source is connected to said oscillator the current flowing through said first circuit biases said feedback circuit in a first polarity for a first predetermined time interval and subsequently the current flowing through said second charging circuit causes an opposite polarity bias to be applied in said feedback circuit for a second predetermined time interval after said first interval.

6. Starting circuitry for oscillators comprising: oscillator means having a feedback circuit for applying a regenerative feedback signal to the input of said oscillator means; means connecting said oscillator to a source of direct current energy for energizing said oscillator; a first charging circuit including a first capacitor and a first resistor connected in series between said feedback circuit and said source; a second charging circuit of longer time constant than said first charging circuit including a second capacitor and a second resistor connected in series between said feedback circuit and said source; and a third resistor connecting the junction of resistor and capacitor of said first charging circuit to the junction of resistor and capacitor of said second charging circuit such that when said source is connected to said oscillator the current flowing through said first circuit biases said feedback circuit in a first polarity for a first predetermined time interval and subsequently the current flowing through said second charging circuit causes an opposite polarity bias to be applied in said feedback circuit for a second predetermined time interval after said first interval.

References Cited by the Examiner

UNITED STATES PATENTS 2,916,687 12/59 Cronin ................ 321—35

FOREIGN PATENTS 1,091,219 10/60 Germany.

JOHN KOMINSKI, *Primary Examiner.*

ARTHUR GAUSS, ROY LAKE, *Examiners.*